US011687889B2

(12) United States Patent
Hamasni et al.

(10) Patent No.: US 11,687,889 B2
(45) Date of Patent: Jun. 27, 2023

(54) SYSTEM AND METHOD FOR CRYPTOGRAPHIC TRANSACTIONS

(71) Applicant: ROYAL BANK OF CANADA, Montreal (CA)

(72) Inventors: Karim Talal Hamasni, Toronto (CA); Stefan Mueller, Singapore (SG); Atilla Murat Firat, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 750 days.

(21) Appl. No.: 16/373,471

(22) Filed: Apr. 2, 2019

(65) Prior Publication Data

US 2019/0303922 A1    Oct. 3, 2019

Related U.S. Application Data

(60) Provisional application No. 62/651,342, filed on Apr. 2, 2018, provisional application No. 62/651,339, filed on Apr. 2, 2018.

(51) Int. Cl.
*G06Q 20/06* (2012.01)
*G06Q 20/36* (2012.01)
(Continued)

(52) U.S. Cl.
CPC ....... *G06Q 20/0658* (2013.01); *G06Q 20/065* (2013.01); *G06Q 20/3678* (2013.01);
(Continued)

(58) Field of Classification Search
CPC ............. G06Q 20/065; G06Q 20/0658; G06Q 20/3678; G06Q 20/381; G06Q 20/3829;
(Continued)

(56) References Cited

U.S. PATENT DOCUMENTS

| 11,354,738 | B1* | 6/2022 | Kurani | ................. G06Q 40/04 |
| 2015/0262140 | A1* | 9/2015 | Armstrong | ......... G06Q 20/3678 |
| | | | | 705/41 |

(Continued)

OTHER PUBLICATIONS

"Western Union Co at Barclays Emerging Payments Forum—Final", dated Mar. 28, 2018 and attached as a PDF file. (Year: 2018).*

(Continued)

*Primary Examiner* — James D Nigh
(74) *Attorney, Agent, or Firm* — Norton Rose Fulbright Canada LLP (57) ABSTRACT

A system and method for handling crypto-asset transactions includes: receiving from a payment processing system an electronic transaction request including: a payment token corresponding to a payment identifier associated with the customer account, and a transaction amount in a fiat currency; determining current price data corresponding to a first crypto-asset and a second crypto-asset associated with the customer account; associating the electronic transaction request with at least one data processing task for executing at least one crypto-asset transaction; and when at least one crypto-asset confidence condition is satisfied based on the current price data of at least one of the first crypto-asset or the second crypto-asset, generating signals for providing, via the payment processing system, an indication that the electronic transaction request is authorized without waiting for confirmation of execution of the at least one crypto-asset transaction in the respective distributed ledger.

25 Claims, 6 Drawing Sheets

(51) Int. Cl.
   *G06Q 20/38* (2012.01)
   *G06Q 20/40* (2012.01)
   *H04L 9/08* (2006.01)
   *H04L 9/00* (2022.01)

(52) U.S. Cl.
   CPC ......... *G06Q 20/381* (2013.01); *G06Q 20/389* (2013.01); *G06Q 20/3829* (2013.01); *G06Q 20/401* (2013.01); *H04L 9/0894* (2013.01); *G06Q 2220/00* (2013.01); *H04L 9/50* (2022.05); *H04L 2209/56* (2013.01)

(58) Field of Classification Search
   CPC ............. G06Q 2220/00; G06Q 20/389; G06Q 20/401; H04L 9/0894; H04L 2209/38; H04L 9/50; H04L 2209/56
   USPC .......................................................... 705/69
   See application file for complete search history.

(56) References Cited

U.S. PATENT DOCUMENTS

| | | | |
|---|---|---|---|
| 2015/0324764 A1* | 11/2015 | Van Rooyen | G06Q 20/0655 705/69 |
| 2015/0332256 A1* | 11/2015 | Minor | G06Q 20/381 705/69 |
| 2016/0342978 A1* | 11/2016 | Davis | G06Q 20/0655 |
| 2017/0140371 A1* | 5/2017 | Forzley | G06Q 20/065 |
| 2019/0236593 A1* | 8/2019 | Vorobyev | G06Q 20/3829 |
| 2020/0097953 A1* | 3/2020 | Islam | G06Q 20/0658 |

OTHER PUBLICATIONS

"Western Union Co at Barclays Emerging Payments Forum—Final", Mar. 14, 2018, 10 pages (Year: 2018).*

* cited by examiner

SYSTEM AND METHOD FOR CRYPTOGRAPHIC TRANSACTIONS

CROSS-REFERENCE

This application is a non-provisional of, and claims all benefit, including priority to: United States Application Nos. 62/651,339 and 62/651,342, both filed Apr. 2, 2018, both entitled, SYSTEM AND METHOD FOR COMPOSITE CRYPTOGRAPHIC TRANSACTIONS, and both incorporated herein by reference.

FIELD

Embodiments of the present disclosure relate generally to the field of cryptographic platforms, and some embodiments particularly relate to systems, methods and devices for cryptographic platforms involving multiple crypto-assets.

INTRODUCTION

The enthusiasm surrounding bitcoin, blockchain and token-based technologies has given rise to numerous cryptocurrencies.

To individual users, managing cryptographic keys and transacting with different cryptographic assets can be a challenge. In some situations, cryptographic asset transactions may take time to be confirmed, and/or may not be compatible or supported by merchant systems or point-of-sale devices.

SUMMARY

In some embodiments, aspects of the present disclosure provide a crypto-asset platform including a crypto-transaction layer for handling transactions involving multiple crypto-assets. In some embodiments, the crypto-transaction layer provides an intelligent, electronic transaction processing layer between a top level transaction layer and the separate underlying crypto-asset platforms.

In accordance with one aspects, there is provided a system for handling crypto-asset transactions. The system includes at least one storage device for storing a customer account; and at least one processor communicably coupled to the at least one storage device, the at least one storage device including executable instructions which when executed by the at least one processor configure the system for: receiving from a payment processing system an electronic transaction request including: a payment token corresponding to a payment identifier associated with the customer account, and a transaction amount in a fiat currency; determining current price data corresponding to a first crypto-asset and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks; associating the electronic transaction request with at least one data processing task for executing at least one crypto-asset transaction, the at least one crypto-asset transaction involving at least one of the first crypto-asset and the second crypto-asset; and when at least one crypto-asset confidence condition is satisfied based on the current price data of at least one of the first crypto-asset or the second crypto-asset, generating signals for providing, via the payment processing system, an indication that the electronic transaction request is authorized without waiting for confirmation of execution of the at least one crypto-asset transaction in the respective distributed ledger.

In accordance with another aspect, there is provided a method for handling crypto-asset transactions. The method includes: receiving from a payment processing system an electronic transaction request including: a payment token corresponding to a payment identifier associated with the customer account, and a transaction amount in a fiat currency; determining current price data corresponding to a first crypto-asset and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks; associating the electronic transaction request with at least one data processing task for executing at least one crypto-asset transaction, the at least one crypto-asset transaction involving at least one of the first crypto-asset and the second crypto-asset; and when at least one crypto-asset confidence condition is satisfied based on the current price data of at least one of the first crypto-asset or the second crypto-asset, generating signals for providing, via the payment processing system, an indication that the electronic transaction request is authorized without waiting for confirmation of execution of the at least one crypto-asset transaction in the respective distributed ledger.

In accordance with another aspect, there is provided a non-transitory, computer-readable medium or media having stored thereon, computer readable instructions which when executed by at least one processor configured the at least one processor for: receiving from a payment processing system an electronic transaction request including: a payment token corresponding to a payment identifier associated with the customer account, and a transaction amount in a fiat currency; determining current price data corresponding to a first crypto-asset and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks; associating the electronic transaction request with at least one data processing task for executing at least one crypto-asset transaction, the at least one crypto-asset transaction involving at least one of the first crypto-asset and the second crypto-asset; and when at least one crypto-asset confidence condition is satisfied based on the current price data of at least one of the first crypto-asset or the second crypto-asset, generating signals for providing, via the payment processing system, an indication that the electronic transaction request is authorized without waiting for confirmation of execution of the at least one crypto-asset transaction in the respective distributed ledger.

In accordance with another aspect, there is provided a system for handling crypto-asset transactions at least one storage device for storing a customer account; and at least one processor communicably coupled to the at least one storage device, the at least one storage device including executable instructions which when executed by the at least one processor configure the system for: receiving from a smart contract interface, a request to trigger a smart contract, the smart contract triggered by a quantity of a first crypto-asset not held in association with the customer account; determining current price data corresponding to the first crypto-asset, and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks; associating the request with at least one data processing task for executing at least one crypto-asset transaction, the at least one crypto-asset transaction involving at least one of the first crypto-asset and the second crypto-asset; and when at least one crypto-asset confidence condition is satisfied based on the current price data of at least one of the first crypto-asset or the second crypto-asset, generating signals for providing the quantity of the first crypto-asset to trigger the smart contract without waiting for confirmation of execution of the at least one crypto-asset transaction in the respective distributed ledger.

In accordance with another aspect, there is provided a system including: at least one memory for storing a customer account; and at least one processor communicably coupled to the at least one memory, the memory including executable instructions which when executed by the at least one processor configure the system for: receiving from a payment processing system an electronic transaction request including: a payment token corresponding to a payment identifier associated with the customer account, and a transaction amount in a fiat currency; retrieving price data associated with a first crypto-asset and a second crypto-asset associated with respective first and second keys stored in the customer account, the customer account corresponding to the payment token; determining a quantity of the first crypto-asset and a quantity of the second crypto-asset to be exchanged to equal the transaction amount based on multi-currency optimization parameters; using a first private key corresponding to the quantity of the first crypto-asset and a first public key associated with a first pool account, the first pool account associated with the first crypto-asset, transferring the quantity of the first crypto-asset to the first pool account; using a second private key corresponding to the quantity of the second crypto-asset and a second public key associated with a second pool account, the second pool account associated with the second crypto-asset, transferring the quantity of the second crypto-asset to the second pool account; and transmitting an authorization signal to the payment processing system indicating that the transaction amount in the fiat currency is authorized.

In accordance with another aspect, there is provided a system comprising: at least one memory for storing a customer account; and at least one processor communicably coupled to the at least one memory, the memory including executable instructions which when executed by the at least one processor configure the system for: receiving from a smart contract interface, a request to trigger a smart contract, the smart contract triggered by a quantity of a first crypto-asset not held in the customer account; retrieving price data associated with the first crypto-asset and a second crypto-asset, the second crypto-asset associated with a corresponding second key stored in the customer account; determining a quantity of the second crypto-asset to be exchanged to equal the quantity of the first crypto-asset; using a first private key associated with a first pool account, the first pool account associated with the first crypto-asset, transferring the quantity of the first crypto-asset to a first ephemeral account associated with the customer account; using a second private key corresponding to the quantity of the second crypto-asset and a second public key associated with a second pool account, the second pool account associated with the second crypto-asset, transferring the quantity of the second crypto-asset to the second pool account; and transferring the quantity of the first crypto-asset from the first ephemeral account to trigger the smart contract.

DESCRIPTION OF THE FIGURES

Reference will now be made to the drawings, which show by way of example embodiments of the present disclosure.

DESCRIPTION OF EXAMPLE EMBODIMENTS

In some situations, cryptographic assets or crypto-assets transacted or all otherwise managed on distributed ledgers may require computation time or other delays before a transaction is confirmed with the reasonable certainty.

For example, some crypto assets may have small transaction volumes, may have long confirmation times, or may otherwise require not insignificant amount of time confirmed. In some situations, a system may require multiple blocks to be confirmed before a transaction can be trusted with an acceptable degree of certainty.

These delays may be inconvenient or unacceptable when handling day-to-day transactions such as a purchase at a physical merchant involving, for example, a point-of-sale device.

In some situations, embodiments may provide systems or methods which may reduce transaction delays or may enable a fiat transaction to proceed without necessarily waiting for a distributed ledger transaction to be confirmed.

Figure 1:
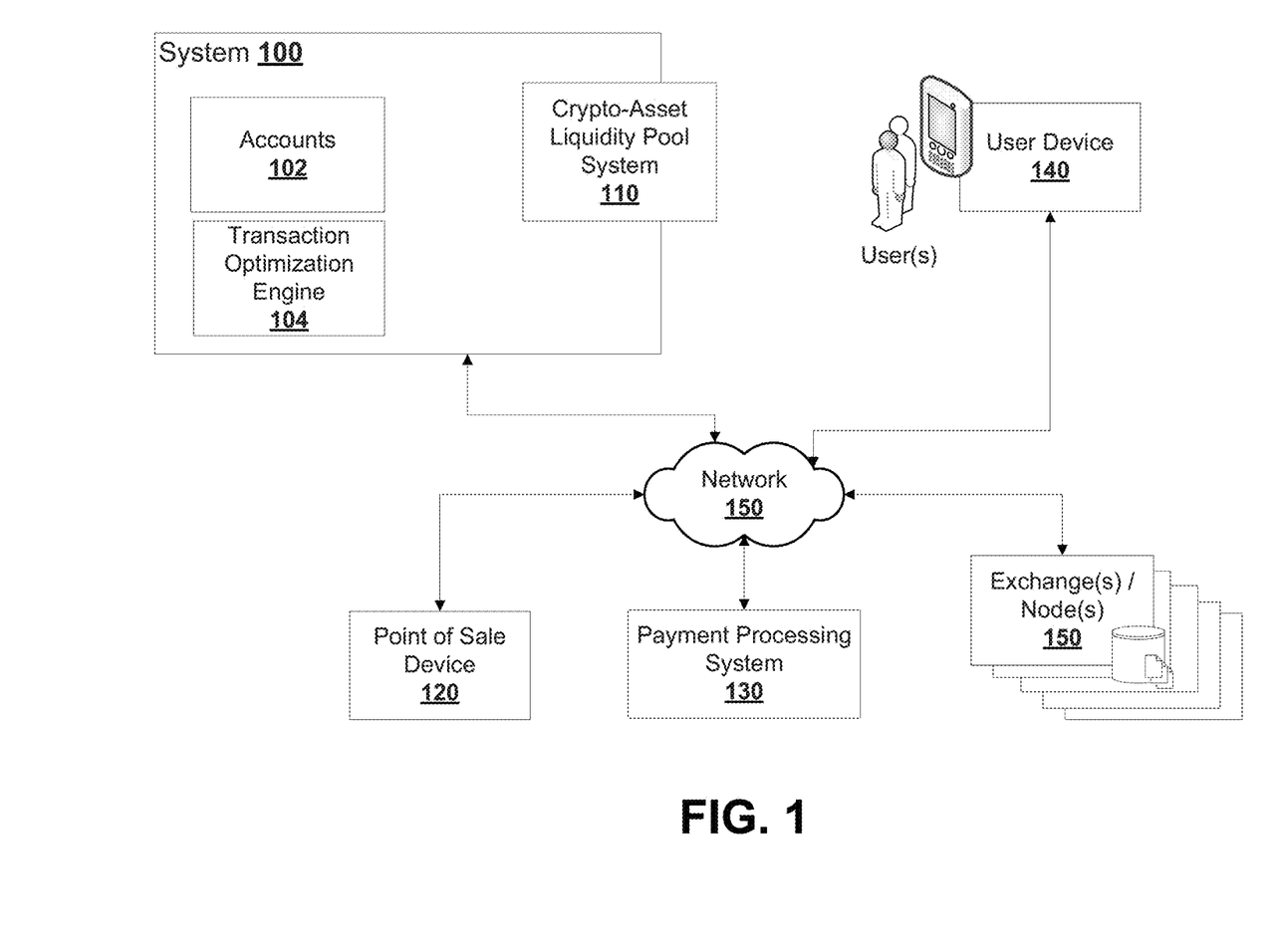
FIG. 1 is a schematic diagram showing aspects of an example electronic crypto-asset platform.

FIG. 1 shows an example system 100 for managing crypto-assets and/or transactions. The system 100 includes one or more electronic devices having one or more memories, processors, storage devices, communication interfaces and/or the like.

One or more aspects of the system 100 are configured to store one or more data structures representing accounts 102, such as customer accounts, or pool accounts. In some embodiments, accounts store or are otherwise associated with one or more crypto-asset keys. In some situations, a pool account can represent an account for holding a pool of crypto-assets for an entity such as a financial institution or crypto-asset liquidity provider. In some embodiments, a pool account can represent a financial institutions crypto asset holdings. In some embodiments, a pool account may be cold storage.

In some embodiments, the system 100 includes or can be in communication with a system for providing a crypto-asset liquidity pool 110. In some embodiments, a crypto-asset liquidity pool is an exchange which converts a crypto-asset into a fiat currency equivalent.

In some embodiments, the crypto-asset transactions can be fulfilled by liquidity or quantities of crypto-assets held by addresses associated with the system, which may be associated with a financial institution or broker. For example, in some embodiments, the system can include an exchange (e.g. liquidity pool) which holds a float of various crypto-assets.

In some embodiments, the crypto-asset transactions can be fulfilled by an exchange external to the system 100. In some embodiments, the crypto-asset transactions can be fulfilled directly through the individual crypto-asset platforms. In some embodiments, the system can be configured to fulfill orders with internal liquidity, and if not available, to remarket the request to $3^{rd}$ party exchanges or crypto-asset platforms.

In some embodiments, the system 100 is configured to be in communication with point-of-sale device(s) 120 such as a payment terminal at a retail store or an online payment server, payment processing systems 130 such as a credit card payment processing system/network, user device(s), and/or crypto-asset exchange(s) and/or node(s).

In some embodiments, accounts 102 can store, link, reference or otherwise be associated with one or more keys/addresses. These keys or addresses can point to blockchain locations or can otherwise provide information to determine how many crypto-assets are associated with a particular account. In some embodiments, accounts can store multiple types of crypto-assets and in such instances will be associated with keys/addresses for different blockchain platforms to provide information as to the quantities of each crypto-asset are stored in/associated with the account. In some embodiments, the account is or is similar to a wallet for storing multiple crypto-assets.

Different types of crypto-assets which can be held in an account include, but are not limited to, bitcoin, Litecoin, Ether, Ripple and the like. In some embodiments, crypto assets may be physical assets such as gold or other tangible assets represented by or otherwise associated with one or more cryptographic tokens.

In some embodiments, the system 100 is configured to track crypto-asset transaction data. For example, in some embodiments, the system 100 tracks fiat purchase prices for the crypto-assets held or otherwise associated with an account. In some embodiments, the system 100 tracks fiat sale prices for crypto-assets being sold or transferred from an account. In some embodiments, the system is configured to track holdings of a crypto asset associated with an account in an internal ledger. For example, if an account holds five bitcoins, the internal ledger show a value of five and a bitcoin holdings field associated with the account, and the actual bitcoins (private keys, addresses, etc.) may be held in a pooled account.

In some embodiments, the system 100 is configured to hold or otherwise manage an account's crypto asset wallet. For example, the account may be associated with private keys, addresses etc. of specific bitcoins on the external bitcoin distributed transaction ledger.

In some embodiments, the system 100 monitors crypto-asset market prices. In some embodiments, the system 100 also monitors crypto-asset book depth.

In some embodiments, the system 100 is configured to receive, pull, or otherwise obtain current prices for crypto assets. In some embodiments, current price data is obtained from exchanges, bid prices, ask prices, crypto asset book depth, recent transactions from nodes or otherwise confirmed on the distributed ledger, open orders, and the like.

Figure 2:
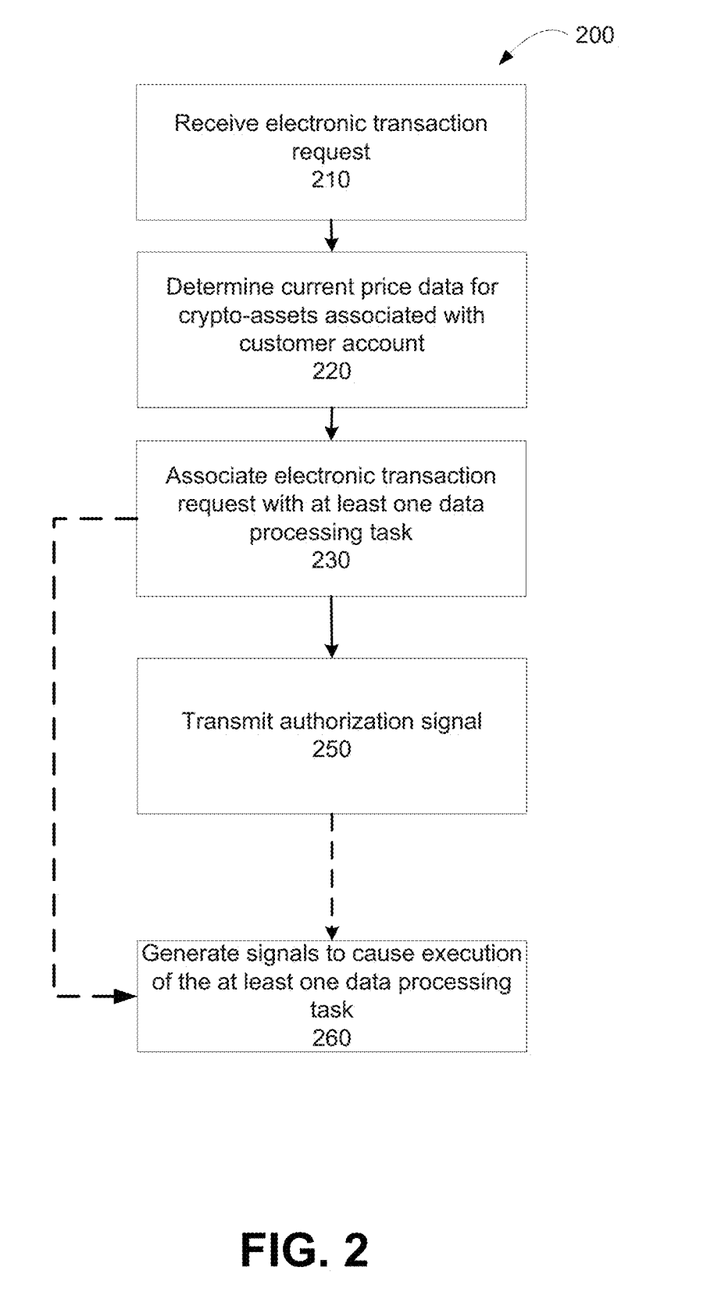
FIGS. 2, 3 and 4 are flowcharts showing aspects of example methods for managing crypto-assets/transactions.

FIG. 2 shows aspects of an example method 200 for cryptographic transactions. At 210, the system 100 receives an electronic transaction request. In some embodiments, the electronic transaction request can be received via a point-of-sale device 120 and/or a payment processing system 130. For example, a customer payment mechanism (e.g. credit card, mobile phone payment) at a merchant point-of-sale device 120 (e.g. at a physical or online store) can generate a transaction request. In some embodiments, the transaction request is processed by a payment processing system 130 (e.g. Visa™ or MasterCard™ systems) which can use a customer token/identifier received with the transaction request to identify the system 100 associated with the customer account corresponding to the customer token/identifier. In some embodiments, the payment processing system 130 generates an authorization request or otherwise sends/forwards a message to the system 100 to request authorization or otherwise initiate a transfer of funds from the customer account as part of the requested transaction.

In some embodiments, customer tokens/identifiers are linked to a customer account. In some embodiments, the customer account can be associated with a fiat balance as well as a crypto-asset account. In some embodiments, when there are inadequate funds in the fiat balance, the system is configured to exchange one or more crypto-assets for fiat funds to fulfill the transaction amount.

In some embodiments, one or more fields in the electronic transaction request may indicate whether to deduct funds from a traditional fiat account, an crypto-asset account or some combination thereof.

In some embodiments, the system may receive input data to define payment preferences which can define which crypto-assets are available for spending and/or priorities for determining an order or combination/ratio in which available crypto-assets are to be spent.

In some embodiments, input data can be received from a payment application (e.g. on a mobile device) associated with or being used in conjunction with a payment request.

In some embodiments, a payment mechanism or data included in the transaction request can define the payment option (e.g. pay from fiat account or crypto-asset account) and/or payment preferences (e.g. crypto-asset order/priorities). In some embodiments, a payment card (such as a credit or debit card) can be configured to send different information in a transaction request generated at the point-of-sale based on a different PIN entry. For example, a payment card may trigger a fiat payment when a first PIN is entered, or a crypto-asset payment when a second PIN is entered.

In some embodiments, payment options and/or preferences may be selected on a payment application on a mobile device, or a dynamic payment card (e.g. one with an e-ink display and one or more buttons or other input devices).

In some embodiments, payment options and/or preferences may be selected on a point-of-sale terminal after a payment card/mobile device has been presented (e.g. via NFC, swiping, etc.).

The message received at the system 100 from the point of sale device and/or payment processing system is an electronic transaction request which includes a payment token. The payment token is or otherwise corresponds to a payment identifier associated with a customer account.

In some embodiments, the electronic transaction request includes a transaction amount. The transaction amount can be in a fiat currency such as dollars, Euros, yen, etc.

In some embodiments, the electronic transaction request includes a flag or other identifier indicating that the transaction request is to use crypto-assets. In some embodiments, the payment token/identifier itself indicates that the transaction request is to transact use crypto-assets. For example, the payment token/identifier may identify or otherwise correspond to an account which holds crypto-assets.

At 220, the system 100 determines current price data corresponding to one or more crypto assets associated with the consumer account. In some embodiments, the system determines current price data corresponding to all of the crypto assets associated with the consumer account. In some embodiments, the system determines current price data corresponding to all of the crypto assets associate with the consumer account with have currently available data, or data which is received within a defined time period.

In some embodiments, determining the current price data includes retrieving market data for crypto-assets associated with the customer account associated or otherwise corresponding to the payment token/identifier.

In some embodiments, retrieving the market data for the crypto-assets includes retrieving or otherwise determining price data and/or book depth for the crypto-assets.

In some embodiments, the system 100 retrieves market data for crypto-assets which correspond to keys stored in or otherwise associated with the customer account.

In some embodiments, current price data associated with one or more crypto assets is based at least partly on cryptographic transaction information stored in distributed ledgers at nodes in a distributed network.

In some embodiments, market prices and/or book depth for crypto-assets can be based on an analysis of the liquidity provided by an internal or related exchange and/or based on data provided by $3^{rd}$ party market exchange(s).

At 230, the system 100 associates the electronic transaction request with one or more data processing tasks. In some embodiments, the data processing task(s) are for or otherwise cause the execution of one or more crypto asset transactions involving one or more crypto assets associated with the consumer account. In some embodiments, the system 100 is configured to determine parameters for the data processing task(s). In some embodiments, the parameters can include parameters for identifying a quantity(ies) of one or more crypto assets to be exchanged, transferred, sold, or otherwise involved in the transaction to satisfy the electronic transaction request received at 210.

In some embodiments, the system 100 is configured to select the one or more crypto assets to be involved in a transaction based on one or more multicurrency optimization parameters. In some embodiments, these optimization parameters can define rules and/or values such as threshold values for selecting or otherwise identifying crypto assets and quantities to be involved in the transaction(s).

In some embodiments, the optimization parameters can define or otherwise identify which crypto assets a consumer has specified to be available for transfer. In some embodiments, the optimization parameters can define priority values or crypto assets associated with the consumer account. These priority values can be used or can otherwise define a priority sequence in which the crypto assets are to be selected for transfer.

In some embodiments, the system 100 determines quantities of the two or more crypto-assets to be exchanged to equal the transaction amount. In some embodiments, the determination is based on multicurrency optimization parameters and/or can involve a transaction optimization engine 104. In some embodiments, the transaction optimization engine 104 can be provided by code executing on one or more processors. In some embodiments, the transaction optimization engine 104 applies one or more optimization parameters and/or algorithms.

In some embodiments, the system 100 is configured to store the fiat cost values for each crypto asset associated with a consumer account. For example, the system 100 can be configured to store the cost that a consumer paid for a crypto asset such as a bitcoin. In some embodiments the system 100 is configured to dynamically adjust the fiat cost value associated with the particular type of crypto asset as transaction data associated with the type of crypto asset and the consumer account is received. For example, electronic transaction data for purchases of bitcoin may be generated/received when a consumer submits requests for transactions to purchase bitcoin using fiat currency or other assets associated with the consumer account.

In some embodiments, when a crypto asset is transferred into the system 100, for example into a crypto asset pool, the system may receive a manual input from the consumer to populate or update the fiat cost value.

In some embodiments, fiat cost values are stored on an asset by asset basis. For example, each bitcoin transaction resulting in ownership of the bitcoin by the consumer account may have its own fiat cost value. In other embodiments, fiat cost values are stored on an asset type by asset type basis. For example, after each bitcoin transaction resulting in ownership of the bitcoin by the consumer account, the system 100 can be configured to updated and adjusted cost base for all bitcoin owned or otherwise associated with the consumer account.

In some embodiments, the system 100 is configured to define the parameters identifying the crypto asset(s) to be transacted upon by or based on an identification of the crypto assets having the largest negative difference between the current price and the corresponding fiat cost value. For example, in the example table below which illustrates data associated with the consumer account, the system 100 may be configured to define a processing task including a parameter identifying Litecoin as the crypto asset to be transacted upon based upon the difference between the purchase price and the current price.

In some embodiments, the system 100 is configured to define parameters identifying two or more crypto assets to be transferred. In some embodiments, when the difference between the current price and a fiat cost value of a first crypto asset is positive, and the difference between the current price and a fiat cost value of a second crypto asset is negative, identify quantities of the first crypto asset and quantities of the second crypto asset to minimize or otherwise offset these differences these differences to result in a zero net gain, a net gain which falls within a defined threshold, or a minimal net gain based on the available crypto assets and current values.

In some embodiments, system 100 is configured to generate one or more data processing tasks for executing one or more crypto asset transactions to satisfy or otherwise corresponding to the electronic transaction request. In some embodiments, a data processing task includes instructions, messages and/or data to cause the initiation of a crypto asset transaction. For example, a data processing task can include a request or other message to cause a crypto asset transaction request to be sent to and/or processed by an exchange, an internal system, and/or a distributed network associated with the crypto asset (for example, a distributed network associate with bitcoin).

At 250, the system 100 configured to generate signals for providing via the payment processing system, an indication that the electronic transaction request is authorized without waiting for confirmation of execution of the crypto asset transaction to be executed by the data processing task. In some embodiments, these signals are generated when one or more crypto asset confidence conditions are satisfied based on current price data of one or more crypto assets associated with the consumer account.

In some embodiments, the system determines that a crypto asset confidence condition is satisfied when a crypto asset identified in the data processing task is associated with a private key which is stored in a storage device associated with the system or as otherwise held or controlled by an entity associated with the system (such as a financial institution). For example, if a financial institution system holds the private keys associated with the consumer account, the financial institution system can be assured that there will not be a double spend problem because the consumer cannot transact with the crypto assets without the private keys. In such a situation, the system may proceed with authorizing the electronic transaction request without waiting for any confirmation of a crypto asset transaction. In some embodiments, the financial institution system holds a private keys when it manages a crypto asset wallet associated with the consumer account. In some embodiments, the financial institution system holds the private keys when the crypto assets associated with the consumer account are held in a pool account, and the crypto assets associate with the consumer account are tracked via an internal ledger (for example, a traditional ledger indicating that the consumer account holds five bitcoins even though the keys, addresses, etc. associated with those bitcoins are held in a pool account).

In some embodiments, another crypto asset confidence condition requires that the product of a quantity of a crypto asset associated with the consumer account in the current price of that crypto asset is greater than a threshold value. In some embodiments, the threshold value is based on the transaction amount of the electronic transaction request. For example in some embodiments, the crypto asset confidence condition requires that the current market value of the crypto asset is equal to or greater than the transaction amount. In some embodiments, the crypto asset confidence condition requires that the current market value of the crypto asset is greater than the transaction amount by a buffer or threshold value. In some embodiments, the buffer value is predefined. In some embodiments, the buffer value is based on historical price fluctuations, liquidity, and other monitored market conditions. In some embodiments, this buffer value can be updated in real time or periodically based on the monitored market conditions.

In some embodiments, the buffer or threshold value can be based on a margin value associate with the consumer account. In some embodiments, the margin value is based on an available credit available to the consumer account. In some embodiments, the margin value corresponds to a positive amount in a fiat holding account that can be put on hold. In some embodiments the margin value corresponds to credit available to the consumer account such as on a loan account, a line of credit, a credit card account, etc.

In some embodiments, the system generates signals authorizing the electronic transaction request when the multiple crypto asset confidence conditions are satisfied. For example, in some embodiments, the market value of the crypto asset greater than the transaction amount, and the system must hold the private keys to the crypto asset in order to satisfy the crypto asset confidence conditions.

At 260, the system 100 is configured to generate signals to cause execution of the data processing tasks. These signals can be generated before concurrently or after the authorization signals have been transmitted at 250.

In some embodiments and situations, the at least one data processing task involves updating an internal system ledger to decrement a quantity of a crypto asset associate with the consumer account by quantity to be transferred to satisfy the electronic transaction request, and incrementing a quantity of the crypto asset associated with a pool account by the corresponding amount.

In embodiments and situations where the system manages a wallet and keys associated with the consumer account, the data processing task includes using a private key corresponding to a quantity of a crypto asset to be transferred from the consumer account wallet and a public key associated with a pool account to generate signals for initiating a cryptographic transfer of the quantity of the crypto asset to the pool account. In some embodiments, the signals include sending transaction to the public crypto asset distributed network for confirmation on the distributed ledger.

In some embodiments, the data processing task for executing the crypto asset transaction includes using a private key corresponding to a quantity of crypto asset to be transferred to generate signals for initiating a cryptographic transfer of the crypto asset for at least the transaction amount in the fiat currency. In some embodiments, the signals include sending transaction data to an exchange system or a distributed network.

In some embodiments, the system 100 is configured to determine that a recipient account associated with electronic transaction and figured to hold or otherwise handle a crypto asset in the consumer account. In some situations, the system 100 can generate a data processing task to update an internal system ledger to decrement a quantity of the crypto asset associate of the consumer account by quantity to be transferred and incrementing the same quantity of the crypto asset associated with the recipient account based on the transaction amount.

In some embodiments, a crypto asset confidence condition is satisfied when the crypto asset transaction is confirmed. For example, in some situations, block 260 may be initiated and completed quickly. In some embodiments, the system is configured to wait for a defined time period, and see if the crypto asset transaction is confirmed within that period, the crypto asset confidence condition is satisfied. In some embodiments, the enablement of this condition and/or the time period may be based on historical confirmation times. In some embodiments, the system is configured to monitor these historical confirmation times and to dynamically update the time period and/or the enablement of this condition.

As noted above or otherwise, in some embodiments, the transaction optimization engine 104 provides a quantities of crypto-assets to be exchanged based on the purchase history of the crypto-assets. In some embodiments, the transaction optimization engine 104 aims to minimize or otherwise reduce taxes caused by the disposition of crypto-assets.

In some jurisdictions, tax agencies such as the Canada Revenue Agency treat crypto-assets as commodities rather than legal tender. A cryptocurrency transaction, where the user spends cryptocurrency on a purchase, can counts as a sale of a commodity and may be subject to capital gains taxes.

In some embodiments, the transaction optimization engine 104 provides an automated tool to minimize tax spend. A customer account may hold a variety of crypto-assets, each with different profits and losses. Account parameters can define which assets are available for spending.

In an example scenario, a customer account holds:

| Crypto-Asset | Number of Units | Purchase Price | Current Price | Profits and Loss |
|---|---|---|---|---|
| Bitcoin | 20 | $500 | $10,000 | $190,000 |
| Litecoin | 100 | $300 | $ 200 | -$ 10,000 |
| Ethereum | 100 | $800 | $ 850 | $ 5000 |

This crypto-asset transaction data can be monitored, updated and stored as transactions add/remove crypto-assets in the customer account.

Figure 3:
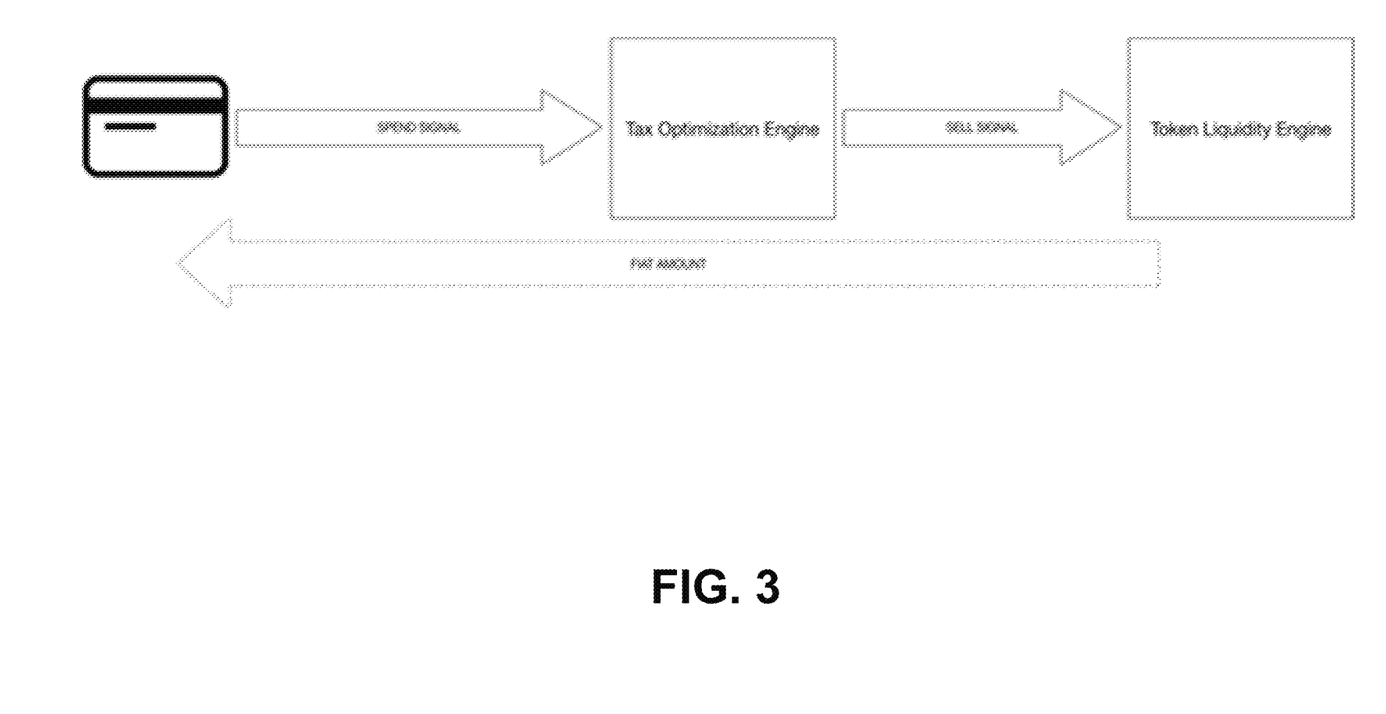

FIG. 3 shows a simplified example transaction data flow. A customer presents a physical payment card at a point-of-sale device. A transaction request is sent to the transaction optimization engine to make a purchase for $11 (e.g. to purchase lunch). In FIG. 3, the transaction optimization engine is a tax optimization engine.

The transaction optimization engine 104 analyzes the crypto-asset transaction data to determine that Litecoin has a current price which is lower than its purchase price, while bitcoin and Ethereum have current prices higher than their purchase prices. Selling bitcoin or Ether could increase taxable gain requirements, while selling Litecoin could decrease taxable gain requirements.

In some embodiments, the transaction optimization engine 104 includes parameters to minimize taxable gain requirements. In the example scenario, the transaction optimization engine 104 prioritizes Litecoin, and determines the amount of Litecoin required to be exchanged to satisfy the $11 purchase. A market order is sent to the liquidity provider, supplied by Token™ or a market exchange pool that converts the cryptocurrency to its fiat equivalent. The Fiat equivalent is then sent back to the payment processing system to close the sale.

The system 100 tracks the claimable losses of –$11 for the customer account. The next time a transaction is requested, e.g. for a coffee worth $3, the transaction optimization engine is configured to take this transaction data into consideration. In some embodiments, the transaction optimization engine is configured to sell a profitable holding to make up for the –$11 loss in the transaction history. For example, the transaction optimization engine can trigger a sale of Bitcoin for the $3, leaving the customer account with a total sale loss amount of –$8.

With a claimable loss parameter of –$8, if a subsequent transaction request is for $100, the system would first sell $8 in Bitcoin, and then the remainder ($92) in the loss leader (Litecoin) to complete the transaction. In some embodiments, the transaction optimization engine triggers multiple crypto-asset transactions based on the tax optimization or other parameters.

In some embodiments, the transaction optimization engine continuously monitors the state of the account in real time for latest pricing to spend the optimum mix. In some embodiments, each asset is provided a score for which to spend. In some embodiments, the score is based on price data, historical transaction data, order book depth, and the like. In some embodiments, the transaction optimization engine weights these parameters with an aim to obtain a fair price for the liquidated crypto-assets. If there is not enough liquidity for the highest scored asset to be sold, the transaction optimization engine automatically moves on to the next highest scored item.

In some embodiments, the system 100 is configured to operate in real or near real time as the customer is spending with their card in store. In some embodiments, a mobile application displays details of a transaction, including exchange rate(s) at the time of purchase, which crypto-assets were sold, etc. In the settings of the mobile app, user inputs can specify which of the assets are available for exchange. In some embodiments, this may provide clients with the ability to exclude certain cryptocurrency assets from spending availability based on their investment strategies.

In some scenarios, the system may reduce tax impacts while enabling the utility/value of crypto-asset investments.

Figure 4:
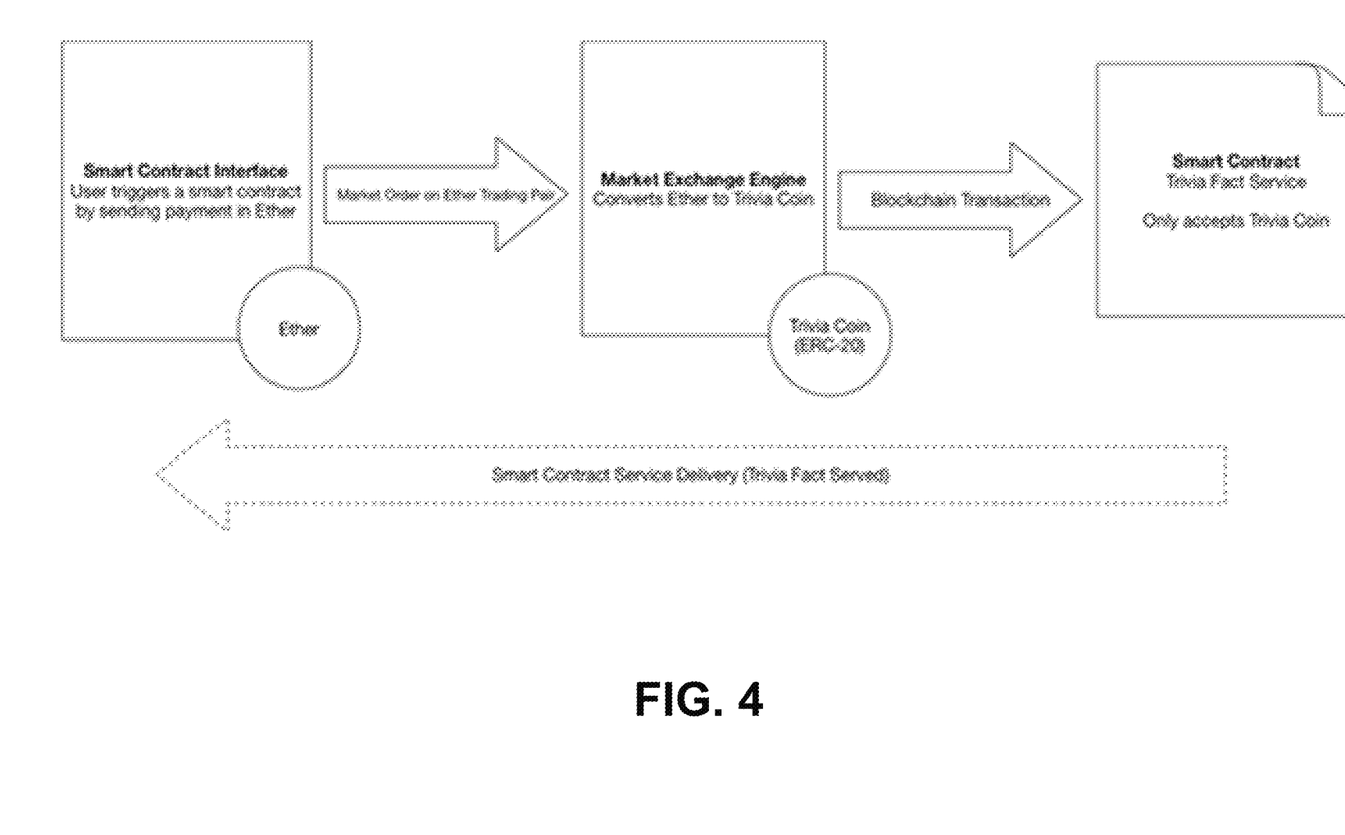

FIG. 4 shows another example transaction flow where a crypto-asset transaction is used to trigger a smart contract based on a different crypto-asset.

In the future, it is anticipated that a significant portion of global business will be powered by smart contract applications, such as contracts based on the Ethereum™ platform. Smart Contracts are often initiated by a proprietary currency specific to it. To acquire the cryptocurrencies required for any number of smart contract interactions would be a daunting task, because there may eventually be thousands of smart contract applications and thousands of different tokens.

In some embodiments, the system 100 can be configured to unify smart contract currencies, or to otherwise provide a platform which requires only a single or a small number of currencies to trigger any number of smart contract which may be based on any crypto-asset. In some embodiments, the can minimize the number of crypto-assets which a customer account would have to hold while empowering them to interact with any number of smart contract platforms.

In some scenarios, the system can provide services to customers which may be triggered by any number of different smart contracts. In some embodiments, the system does not necessarily need to complicate and/or expand the scope of crypto-assets which can be held in a customer account.

In some embodiments, the system 'remarkets' the purchase of the contract specific coin to a third-party exchange that can provide the needed liquidity to fill the order.

Via a smart contract interface, the system 100 receives a request to trigger a smart contract. The smart contract is triggered by a quantity of a first crypto-asset (e.g. Trivia Coin).

The system 100 retrieves prices data associated with the first crypto-asset as well as a second crypto-asset held by the customer account.

The system 100 determines a quantity of the second crypto-asset to be exchanged to equal the quantity of the first crypto-asset, transfers the appropriate quantities, and triggers the smart contract.

In some embodiments, this process may involve a temporary or ephemeral account to hold the first crypto-asset until it is used to trigger the smart contract.

In some embodiments, the system manage its own pool of each type of token for the smart contracts supported by the system that can be connected to in order to provide immediate liquidity. In some embodiments, the system may mitigate price risk, by holding an amount proportional to the popularity of the smart contract.

In some embodiments, a formula can be employed that determines the amount to be held based on historical demand and/or anticipated demand. Alternatively or additionally, the system can employ the 0x smart contract protocol to do these conversions in near real time. In some situations, this approach can result in additional fees but can reduce/eliminate price risk.

Figure 6:
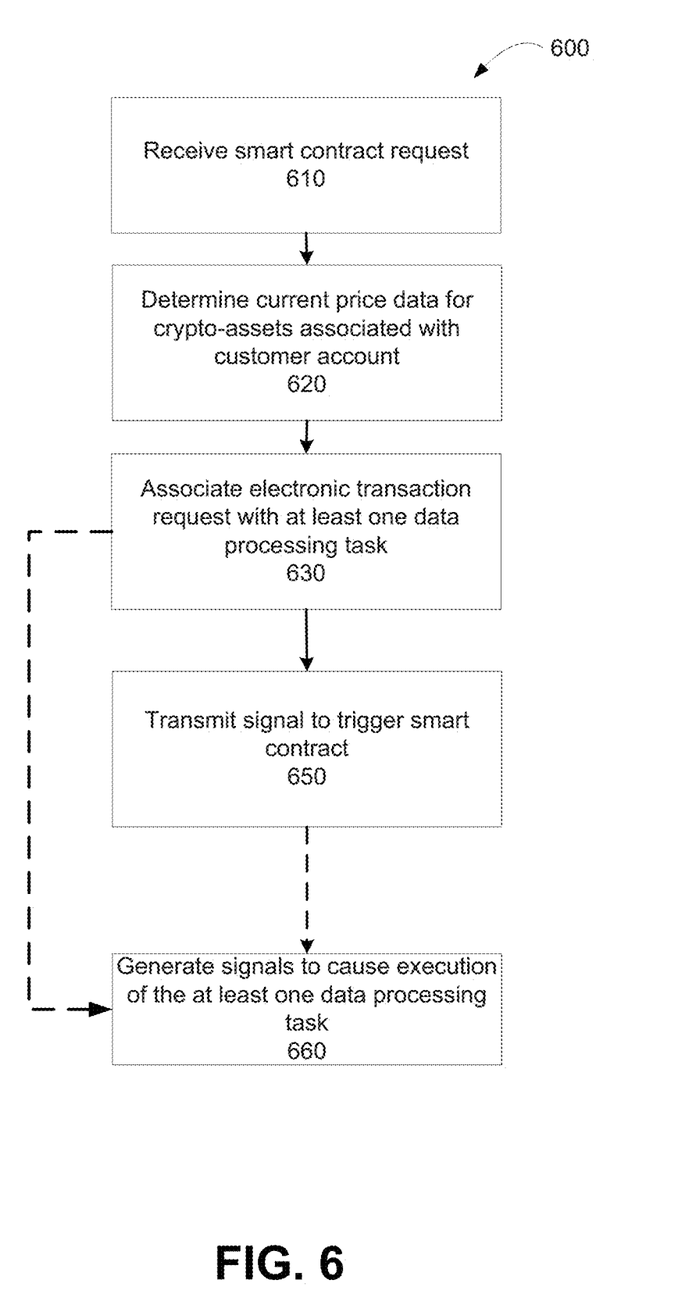
FIG. 6 is a flowcharts showing aspects of an example method for managing crypto-assets/transactions.

FIG. 6 is a block diagram showing aspects of an example method 600. Blocks 610, 620, 630, 650, and 660 are similar or otherwise can be implemented in the same or similar fashion as blocks to 210, 220, 230, 250, and 260 respectively. In some situations, this may enable a smart contract to be triggered without necessarily waiting for an intermediate crypto asset transaction to be confirmed.

Figure 5:
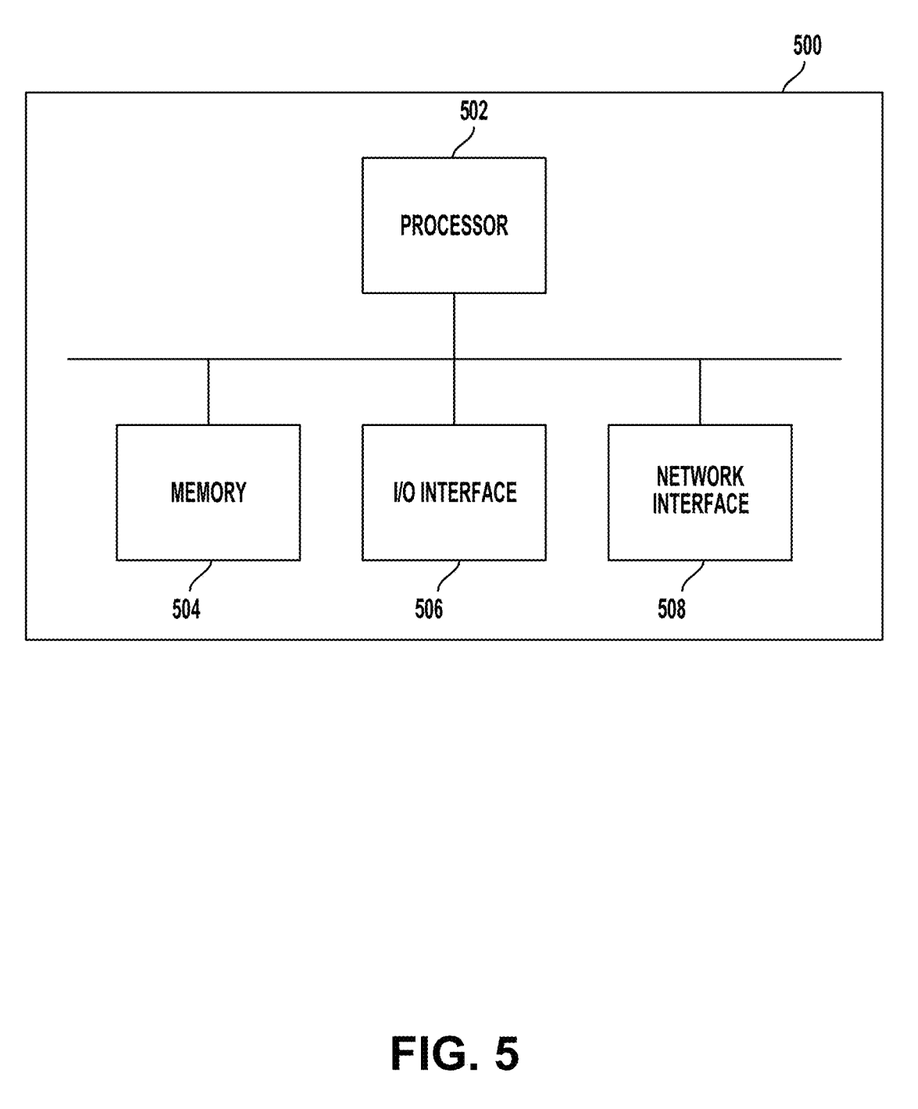
FIG. 5 is a schematic diagram showing aspects of an example computing device which can comprise part of a system for managing crypto-assets/transactions.

FIG. 5 is a schematic diagram of computing device 500, exemplary of an embodiment. As depicted, computing device 4 includes at least one processor 502, memory 504, at least one I/O interface 506, and at least one network interface 508.

Each processor 502 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 500 is operable to register and authenticate users (using a login, unique identifier, and password for example) prior to providing access to applications, a local network, network resources, other networks and network security devices. Computing devices 4 may serve one user or multiple users.

Although the embodiments have been described in detail, it should be understood that various changes, substitutions and alterations can be made herein without departing from the scope as defined by the appended claims.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for handling crypto-asset transactions, the system comprising:
at least one memory for storing a customer account; and
at least one processor communicably coupled to the at least one storage device, the at least one storage device including executable instructions which when executed by the at least one processor configure the system for:
receiving from a payment processing system an electronic transaction request including: a payment token corresponding to a payment identifier associated with the customer account, and a transaction amount in a fiat currency;
determining current price data corresponding to a first crypto-asset and a second crypto-asset associated with the customer account, the current price data associated with the first crypto-asset and the second crypto-asset based at least in part on respective cryptographic transaction information stored in respective distributed ledgers at respective pluralities of nodes in respective distributed networks;
associating the electronic transaction request with at least one data processing task for executing at least one crypto-asset transaction, the at least one crypto-asset transaction involving at least one of the first crypto-asset and the second crypto-asset; and
when at least one crypto-asset confidence condition is satisfied based on the current price data of at least one of the first crypto-asset or the second crypto-asset, generating signals for providing, via the payment processing system, an indication that the electronic transaction request is authorized, wherein the at least one crypto-asset confidence condition is satisfied when the at least one crypto asset transaction is confirmed in the respective distributed ledger within a defined time period, the defined time period being dynamically updated based on historical confirmation times.

2. The system of claim 1, wherein the instructions which when executed by the at least one processor configure the system for:
determining parameters for the at least one data processing task, the parameters identifying a quantity of at least one of the first crypto-asset and the second crypto-asset to be exchanged in the at least one crypto-asset transaction based on multicurrency optimization parameters.

3. The system of claim 2, wherein the instructions which when executed by the at least one processor configure the system for:
storing, in association with the customer account in the at least one storage device, a fiat cost value for each of the first crypto-asset and the second crypto-asset; and
defining the parameters identifying at least one of the first crypto-asset and the second crypto-asset based on:
determining a first difference between the current price data and the corresponding fiat cost value associated with the first crypto-asset;
determining a second difference between the current price data and the corresponding fiat cost value associated with the second crypto-asset; and
identifying a crypto-asset to be transacted from the first crypto-asset or the second crypto-asset based on a comparison of the first difference and the second difference.

4. The system of claim 1, wherein the at least one crypto-asset confidence condition is satisfied when a crypto-asset identified in the data processing task is associated with a private key stored in the at least one storage device.

5. The system of claim 4, wherein the private key is stored in association with the customer account; and
wherein the instructions which when executed by the at least one processor configure the system for:
generating the at least one data processing task for executing the at least one crypto-asset transaction, the at least one data processing task including: using the private key corresponding to a quantity of the first crypto-asset to be transferred and a first public key associated with a first pool account, the first pool account associated with the first crypto-asset, generating signals for initiating a cryptographic transfer of the quantity of the first crypto-asset to the first pool account.

6. The system of claim 4, wherein the instructions which when executed by the at least one processor configure the system for:
generating the at least one data processing task for executing the at least one crypto-asset transaction, the at least one data processing task includes updating an internal system ledger to decrement a quantity of the first crypto-asset associated with the customer account by a quantity to be transferred, and incrementing a quantity of first crypto-asset associated with a pool account by the quantity to be transferred.

7. The system of claim 4, wherein the instructions which when executed by the at least one processor configure the system for:
generating the at least one data processing task for executing the at least one crypto-asset transaction, the at least one data processing task including: using the private key corresponding to a quantity of the first crypto-asset to be transferred, generating signals for initiating a cryptographic transfer of the quantity of the first crypto-asset for at least the transaction amount in the fiat currency on the distributed ledger.

8. The system of claim 1, wherein the at least one crypto-asset confidence condition includes a condition that a product of a quantity of the first crypto-asset associated with the customer account and the current price data is greater than a threshold value based on the transaction amount.

9. The system of claim 8, wherein the threshold value is based on a margin value associated with the customer account.

10. The system of claim 2 wherein the multicurrency optimization parameters define a customer-specified availability of the first or the second crypto-asset to be transferred.

11. The system of claim 2, wherein the multicurrency optimization parameters define priority values of the first or the second crypto-asset to be transferred, the priority values defining a priority sequence in which the first and the second crypto-assets are to be selected for transferred.

12. The system of claim 2, wherein the instructions which when executed by the at least one processor configure the system for: identifying a quantity of first crypto-asset and a quantity of the second crypto-asset to offset a positive difference between the current price and the corresponding fiat cost value associated with the first crypto-asset by a negative difference between the current price and the corresponding fiat cost value associated with the second crypto-asset.

13. The system of claim 4, wherein the instructions which when executed by the at least one processor configure the system for:
upon determining that a recipient account associated with the electronic transaction is configured to handle the first crypto-asset;
generating the at least one data processing task for executing the at least one crypto-asset transaction, the at least one data processing task includes updating an internal system ledger to decrement a quantity of the first crypto-asset associated with the customer account by a quantity to be transferred, and incrementing a quantity of first crypto-asset associated with the recipient account by the quantity to be transferred.

14. A method for handling crypto-asset transactions, the method comprising:
receiving from a payment processing system an electronic transaction request including: a payment token corresponding to a payment identifier associated with a customer account stored in at least one storage device, and a transaction amount in a fiat currency;
determining current price data corresponding to a first crypto-asset and a second crypto-asset associated with customer account, the current price data associated with the first crypto-asset and the second crypto-asset based at least in part on respective cryptographic transaction information stored in respective distributed ledgers at respective pluralities of nodes in respective distributed networks;
associating the electronic transaction request with at least one data processing task for executing at least one crypto-asset transaction, the at least one crypto-asset transaction involving at least one of the first crypto-asset and the second crypto-asset; and
when at least one crypto-asset confidence condition is satisfied based on the current price data of at least one of the first crypto-asset or the second crypto-asset, generating signals for providing, via the payment processing system, an indication that the electronic transaction request is authorized, wherein the at least one crypto-asset confidence condition is satisfied when the at least one crypto asset transaction is confirmed in the respective distributed ledger within a defined time period, the defined time period being dynamically updated based on historical confirmation times.

15. The method of claim 14, comprising:
determining parameters for the at least one data processing task, the parameters identifying a quantity of at least one of the first crypto-asset and the second crypto-asset to be exchanged in the at least one crypto-asset transaction based on multicurrency optimization parameters.

16. The method of claim 15, further comprising:
storing, in association with the customer account in the at least one storage device, a fiat cost value for each of the first crypto-asset and the second crypto-asset; and
defining the parameters identifying at least one of the first crypto-asset and the second crypto-asset based on:
determining a first difference between the current price data and the corresponding fiat cost value associated with the first crypto-asset;
determining a second difference between the current price data and the corresponding fiat cost value associated with the second crypto-asset; and identifying a crypto-asset to be transacted from the first crypto-asset or the second crypto-asset based on a comparison of the first difference and the second difference.

17. The method of claim 14, wherein the at least one crypto-asset confidence condition is satisfied when a crypto-asset identified in the data processing task is associated with a private key stored in the at least one storage device.

18. The method of claim 17, wherein the private key is stored in association with the customer account; and the method further comprises:
generating the at least one data processing task for executing the at least one crypto-asset transaction, the at least one data processing task including: using the private key corresponding to a quantity of the first crypto-asset to be transferred and a first public key associated with a first pool account, the first pool account associated with the first crypto-asset, generating signals for initiating a cryptographic transfer of the quantity of the first crypto-asset to the first pool account.

19. The method of claim 16, further comprising:
generating the at least one data processing task for executing the at least one crypto-asset transaction, the at least one data processing task includes updating an internal system ledger to decrement a quantity of the first crypto-asset associated with the customer account by a quantity to be transferred, and incrementing a quantity of first crypto-asset associated with a pool account by the quantity to be transferred.

20. The method of claim 17, further comprising:
generating the at least one data processing task for executing the at least one crypto-asset transaction, the at least one data processing task including: using the private key corresponding to a quantity of the first crypto-asset to be transferred, generating signals for initiating a cryptographic transfer of the quantity of the first crypto-asset for at least the transaction amount in the fiat currency on the distributed ledger.

21. The method of claim 14, wherein the at least one crypto-asset confidence condition includes a condition that a product of a quantity of the first crypto-asset associated with the customer account and the current price data is greater than a threshold value based on the transaction amount.

22. The method of claim 15, comprising: identifying a quantity of first crypto-asset and a quantity of the second crypto-asset to offset a positive difference between the current price and the corresponding fiat cost value associated with the first crypto-asset by a negative difference between the current price and the corresponding fiat cost value associated with the second crypto-asset.

23. The system of claim 17, further comprising:
upon determining that a recipient account associated with the electronic transaction is configured to handle the first crypto-asset;
generating the at least one data processing task for executing the at least one crypto-asset transaction, the at least one data processing task includes updating an internal system ledger to decrement a quantity of the first crypto-asset associated with the customer account by a quantity to be transferred, and incrementing a quantity of first crypto-asset associated with the recipient account by the quantity to be transferred.

24. A non-transitory, computer-readable medium or media having stored thereon, computer readable instructions which when executed by at least one processor configured the at least one processor for:
receiving from a payment processing system an electronic transaction request including: a payment token corresponding to a payment identifier associated with the customer account, and a transaction amount in a fiat currency;
determining current price data corresponding to a first crypto-asset and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks;
associating the electronic transaction request with at least one data processing task for executing at least one crypto-asset transaction, the at least one crypto-asset transaction involving at least one of the first crypto-asset and the second crypto-asset; and
when at least one crypto-asset confidence condition is satisfied based on the current price data of at least one of the first crypto-asset or the second crypto-asset, generating signals for providing, via the payment processing system, an indication that the electronic transaction request is authorized, wherein the at least one crypto-asset confidence condition is satisfied when the at least one crypto asset transaction is confirmed in the respective distributed ledger within a defined time period, the defined time period being dynamically updated based on historical confirmation times.

25. A system for handling crypto-asset transactions at least one memory for storing a customer account; and
at least one processor communicably coupled to the at least one storage device, the at least one storage device including executable instructions which when executed by the at least one processor configure the system for:
receiving from a smart contract interface, a request to trigger a smart contract, the smart contract triggered by a quantity of a first crypto-asset not held in association with the customer account;
determining current price data corresponding to the first crypto-asset, and a second crypto-asset associated with the customer account, the current price data associated with the first crypto-asset and the second crypto-asset based on at least in part on respective cryptographic transaction information stored in respective distributed ledgers at respective pluralities of nodes in respective distributed networks;
associating the request with at least one data processing task for executing at least one crypto-asset transaction, the at least one crypto-asset transaction involving at least one of the first crypto-asset and the second crypto-asset; and
when at least one crypto-asset confidence condition is satisfied based on the current price data of at least one of the first crypto-asset or the second crypto-asset, generating signals for providing the quantity of the first crypto-asset to trigger the smart contract wherein the at least one crypto-asset confidence condition is satisfied when the at least one crypto asset transaction is confirmed in the respective distributed ledger within a defined time period, the defined time period being dynamically updated based on historical confirmation times.

* * * * *